US011003406B2

(12) United States Patent
Christy et al.

(10) Patent No.: US 11,003,406 B2
(45) Date of Patent: May 11, 2021

(54) SYSTEM AND METHOD FOR MANAGING PRINT JOBS BY DETERMINING OPTIMAL PRINTERS AND COMPARING ITEMIZED ACTUAL AND ESTMATED COSTS

(71) Applicant: Origami Software, LLC, Southfield, MI (US)

(72) Inventors: Paul J. Christy, Birmingham, MI (US); Geoffrey T. Keyes, Plymouth, MI (US)

(73) Assignee: ORIGAMI SOFTWARE, LLC, Birmingham, MI (US)

( * ) Notice: Subject to any disclaimer, the term of this patent is extended or adjusted under 35 U.S.C. 154(b) by 0 days.

(21) Appl. No.: 16/869,992

(22) Filed: May 8, 2020

(65) Prior Publication Data
US 2020/0356328 A1   Nov. 12, 2020

Related U.S. Application Data

(60) Provisional application No. 62/845,453, filed on May 9, 2019.

(51) Int. Cl.
*G06F 3/12*      (2006.01)

(52) U.S. Cl.
CPC .......... *G06F 3/1267* (2013.01); *G06F 3/1204* (2013.01); *G06F 3/1212* (2013.01); *G06F 3/1218* (2013.01); *G06F 3/1219* (2013.01); *G06F 3/1232* (2013.01); *G06F 3/1237* (2013.01); *G06F 3/1253* (2013.01)

(58) Field of Classification Search
None
See application file for complete search history.

(56) References Cited

U.S. PATENT DOCUMENTS

| | | | | |
|---|---|---|---|---|
| 5,383,129 | A  * | 1/1995 | Farrell | G03G 21/02 |
| | | | | 705/400 |
| 9,950,548 | B2 * | 4/2018 | Okamoto | B41J 29/393 |
| 2002/0165833 | A1 * | 11/2002 | Minowa | H04N 1/00002 |
| | | | | 705/400 |
| 2017/0186020 | A1 * | 6/2017 | Kodmer | H04N 1/32101 |

* cited by examiner

*Primary Examiner* — Scott A Rogers
(74) *Attorney, Agent, or Firm* — Carlson, Gaskey & Olds, P.C.

(57) ABSTRACT

A computer-implemented method according to an example of the present disclosure includes obtaining, for each of a plurality of PPMs of an organization, a profile that indicates operating parameters of the PPM. IECs for a plurality of print-related tasks are stored in a database, the IECs including material costs and labor costs for the print-related tasks. For each print job received, an optimal PPM set is determined that includes one or a combination of the eligible PPMs to use for the print job based on the PPM profiles, the print-related tasks needed for the print job, and the itemized estimated costs of the print-related tasks. IACs are determined for received print jobs based on shop floor data from the organization. A notification that proposes a change to a particular IEC is transmitted based on a difference between the IEC and its corresponding IAC differing by more than a predefined threshold.

20 Claims, 3 Drawing Sheets

SYSTEM AND METHOD FOR MANAGING PRINT JOBS BY DETERMINING OPTIMAL PRINTERS AND COMPARING ITEMIZED ACTUAL AND ESTMATED COSTS

CROSS-REFERENCE TO RELATED APPLICATIONS

This application claims the benefit of U.S. Provisional Application No. 62/845,453, filed May 9, 2019, the disclosure of which is incorporated herein by reference in its entirety.

BACKGROUND

This application relates to printing, and more particularly to a method and apparatus for managing print jobs.

Processing print jobs is challenging process, both in relation to performance of the print job and properly estimating the costs of the print job. Proper cost estimation typically involves estimating the material needed, the setup and run spoilage, the setup time, the cleanup time, and the run time. These can differ greatly for different printing machines and different types of print jobs. Consider an example organization that has five printers, five cutting machines, and seven folding machines. That yields 175 different combinations of machines that can be used for jobs that require printing, cutting, and folding, and 175 different estimating scenarios. When faced with conditions such as these, print organizations resort to inaccurate cost estimates that do not accurately reflect actual costs.

SUMMARY

A computer-implemented method according to an example of the present disclosure includes obtaining, for each of a plurality of print processing machines (PPMs) of an organization, a profile that indicates a plurality of operating parameters of the PPM. Itemized estimated costs for a plurality of print-related tasks are stored in a database, the itemized estimated costs including material costs and labor costs for the print-related tasks. A plurality of print jobs are received. For each print job, an optimal PPM set that includes one or a combination of the PPMs that are eligible to use for the print job is determined based on the PPM profiles, the print-related tasks needed for the print job, and the itemized estimated costs of the print-related tasks. Itemized actual costs for the plurality of print jobs are determined based on shop floor data from the organization. The itemized actual costs are compared to corresponding ones of the itemized estimated costs. A notification that proposes a change to a particular itemized estimated cost is transmitted based on a difference between the itemized actual cost and itemized estimated cost exceeding a predefined threshold.

A computing device according to an example of the present disclosure includes memory and a processor operatively connected to the memory. The processor is configured to obtain, for each of a plurality of print processing machines (PPMs) of an organization, a profile that indicates a plurality of operating parameters of the PPM. The processor is also configured to store itemized estimated costs for a plurality of print-related tasks in a database, the itemized estimated costs including material costs and labor costs for the print-related tasks. The processor is configured to receive a plurality of print jobs, and for each print job, determine an optimal PPM set that includes one or a combination of the PPMs that are eligible to use for the print job based on the PPM profiles, the print-related tasks needed for the print job, and the itemized estimated costs of the print-related tasks. The processor is configured to determine itemized actual costs for the plurality of print jobs based on shop floor data from the organization, and compare the itemized actual costs to corresponding ones of the itemized estimated costs. The processor is configured to transmit a notification that proposes a change to a particular itemized estimated cost based on a difference between the itemized actual cost and itemized estimated cost exceeding a predefined threshold.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
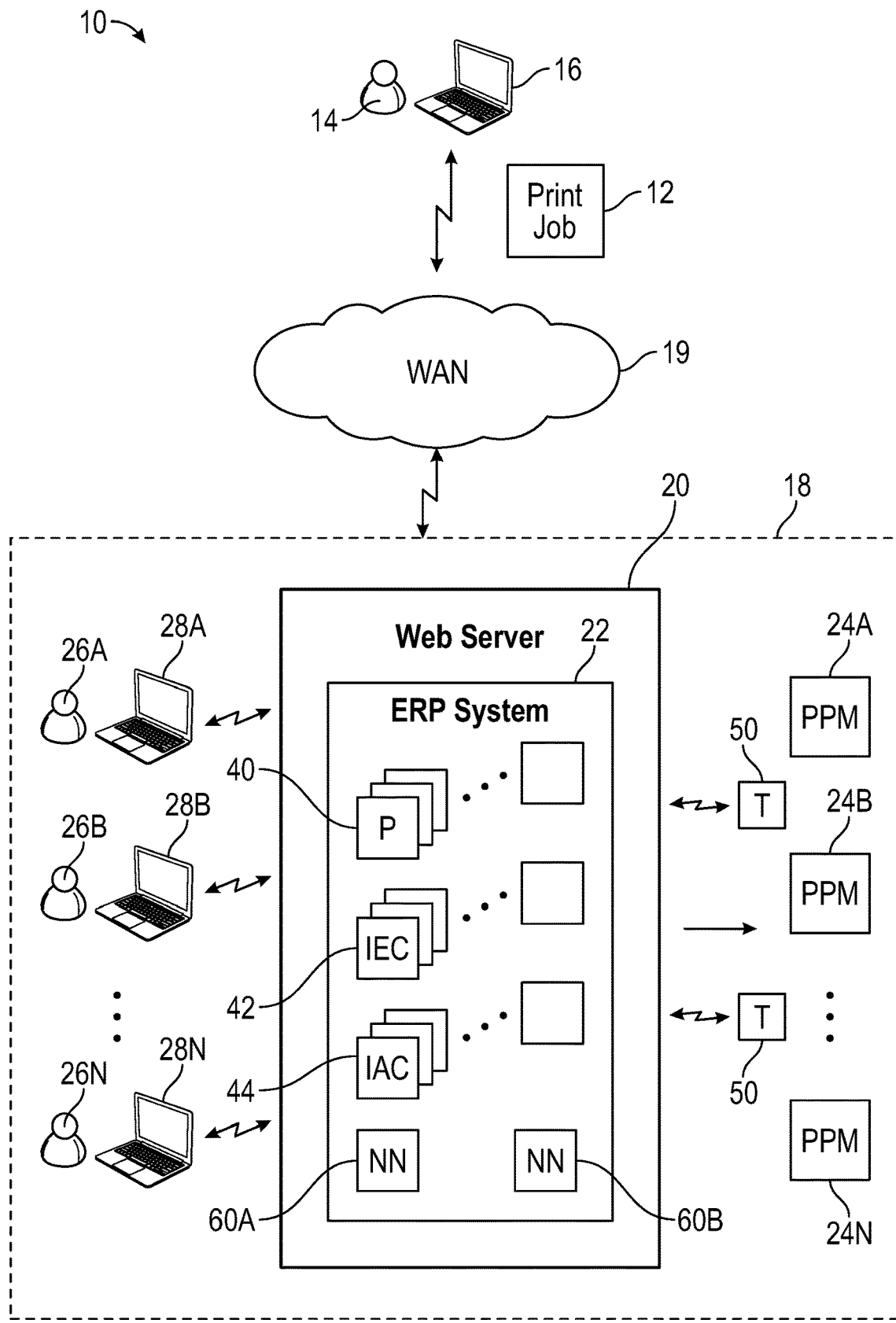
FIG. 1 is a schematic view of a system for managing print jobs.

FIG. 1 schematically illustrates an example system 10 for managing print jobs 12. A customer 14 utilizes their computing device 16 to transmit a print job 12 to a commercial printing organization 18 through a wide area network (WAN) 19 (e.g., the Internet).

A web server 20 of the organization 18 includes an Enterprise Resource Planning (ERP) system 22 that receives and manages the print job 12. The ERP system 22 includes functionality for pricing and processing print jobs 12, and may also include other functionality (e.g., accounting, order tracking, etc.). Although a single web server 20 is shown, it is understood that in some examples, functionality of the web server 20 can be distributed among multiple computing devices (e.g., a cluster of servers).

The organization 18 includes a plurality of print processing machines (PPMs) 24A-N of different types, which include a plurality of different types of printers and optionally include at least one finishing machine.

Some example types of printers that may be used as part of the PPMs 24 include the following:
  digital printers (that print from a digital-based image directly to a variety of media),
  large format printers (e.g., utilizing printer rolls having a width of 18"-100"),
  grand format printers (e.g., utilizing printer rolls having a width of 100"+),
  web press printers,
  envelope printers,
  foil stampers,
  screen printers (for printing on apparel), and
  letterpress printers.

"Web press printers" feed a large reel of paper through a large press machine in several parts, typically for several feet, which then prints continuously as the paper is fed through. Web press printers use an offset printing technique in which the inked image is transferred (or "offset") from a plate to a rubber blanket, then to the printing surface.

Some example finishing machines that may be used as part of the PPMs 24 include the following:
- folding machines,
- binding machines,
- counting machines,
- sorting machines,
- gluing machines,
- cutting machines (e.g., die cutters for cutting paper, laser cutters for cutting material, water jets for cutting metal, routers for cutting wood), and
- router machines, (e.g., digital printers, large format printers, web press printers, envelope printers).

The laser cutters mentioned above can be used for cutting things such as labels, vinyl, coroplastic, and the like.

A variety of users 26A-N utilize their respective computing devices 28A-N to utilize the ERP system 22 for the print job 12. This could include users in different departments of the organization 18, for example (e.g., art department, prepress department, finishing department, sales department, shipping department, customer service department, etc.). It is to be understood that a reference numeral in conjunction with the letter "N" (e.g., 24N, 26N, 28N) is used to denote a plurality of a given item of a non-specific quantity. Thus, the "N" quantity of printers is not necessarily the same as the "N" quantity of users 26.

Unlike a print job that may be done in one's home on a consumer grade home printer, a commercial printing job is a significantly more complex and involved process as such jobs typically have a more complex setup process and/or a more complex finishing process, and there are a myriad of options for completing such print jobs.

Consider a print job for business cards, which typically have a dimension of 3.5"×2". First, there are many different types of paper that could be used for the business cards, such as cover stock, vellum Bristol, index, tag, railroad board, bond, kraft, coated, etc. Based on the paper that is used, different printers can be selected, and plates may need to be prepared (e.g., a respective plate for each color for each side of the business card that uses a given color, and if a coating is used then a separator plate needs to be used for the coating).

As another example, consider a booklet print job, which is more complex than a business card. Booklet printing involves setting up artwork correctly on the sheets (imposition/signatures) and then running the job as either a work-and-tur, work-and-tumble, or sheetwise. It can also use two different papers (one for the cover, and one for the inside sheets). Then, depending on how the booklet is set up, one would likely need a bindery machine to fold it and bind it. Most bindery machines have inline cutting, but if one doesn't, then a worker would likely need to perform trimming separately from the bindery machine.

There are labor costs associated with such setup, such as plate preparation charges, and there are also labor costs for performing and completing the print job, such as reloading paper, cutting charges, boxing charges, and shipping charges. There are also materials costs for paper, ink, and possibly for printing and/or coating plates.

If the business card includes graphical elements, it may need to be analyzed by a printing specialist to determine how to achieve a given combination of colors (e.g., how many plates should be used, whether toner-based, CMYK, or KMS ink is preferable, etc.). From this one example, it becomes clear that there are a myriad of options for print jobs. The number of options expands when different substrates are used, such as fabric, synthetic paper (e.g., waterproof paper), cardboard, wood, vinyl, metal, etc.

The ERP system 22 includes at least one profile 40 for each of the PPMs 24 that indicates operating parameters of the PPM 24. Some example operating parameters for a plurality of printer PPMs (PPM1, PPM2, PPM3, and PPM4) are shown in Table 1 below. As shown from this limited number of examples, the parameters differ between PPMs 24, which complicates the process of determining which machine would be optimal for a given print job, and how much it would cost if a particular printer PPM 24 were used.

TABLE 1

| Parameter | PPM 1 | PPM2 | PPM3 | PPM4 |
| --- | --- | --- | --- | --- |
| Machine Type | Printer | Printer | Printer | Printer |
| Machine Base Selection | Sheet | Sheet | Sheet | Roll |
| Min. Sheet Width | 8.27 inches | 11 inches | 8.27 inches | 15.7 inches |
| Min. Sheet Length | 11.02 inches | 17 inches | 11.02 inches | 999,999 inches |
| Max Sheet Width | 20.87 inches | 13 inches | 20.8 inches | 30 inches |
| Max Sheet Length | 29.13 inches | 19 inches | 29.13 inches | 999,999 inches |
| Max Sheet Height | 0.024 inches | 0.016 inches | 0.024 inches | 0.0095 inches |
| Max Image Width | 20.08 inches | 12.48 inches | 20.08 inches | 29 inches |
| Max Image Length | 29.13 inches | 17.7 inches | 29.13 inches | 43 inches |
| Print Type | Offset | Digital | Offset | Digital |
| Top Margin (Gripper) | 0.39 inches | 0.39 inches | 0.39 inches | 0 inches |
| Bottom Margin | 0.32 inches | 0.25 inches | 0.32 inches | 0 inches |
| Side Margin | 0.32 inches | 0.25 inches | 0.32 inches | 0.25 inches |

The ERP system 22 determines a PPM set that is optimal for the print job 12. The optimal PPM set includes one or more of the PPMs 24. Consider an example in which paper needs to be cut, such as business cards. For such a job, the optimal PPM set may include a first PPM 24 that is a printer and a separate second PPM 24 that is a cutter, or may include just a single PPM 24 that is a printer and includes cutting functionality.

What constitutes an optimal PPM set can vary depending on a number of factors, such as cost, machine availability, print quantity, etc. Some printers may need to be excluded because a given print job is not compatible with their printing parameters (e.g., a building wrap likely cannot be printed on a typical digital printer). A machine that is not compatible with a given print job 12 is considered not eligible for the print job 12.

In many instances, there are multiple sets of PPMs 24 that could be used for a given print job, but whether they are optimal could depend on factors. For example, if the customer 14 wants to print 500 envelopes a digital printer could suffice. Although an envelope printer would print envelopes more quickly, the cost and time of setting up the envelope printer would likely be cost prohibitive for an order of 500 envelopes. However, if the customer 14 wants to print 100,000 envelopes, then the setup costs would likely be justified.

The ERP system 22 stores itemized estimated costs (IECs) 42 for a plurality of print-related tasks for a set of PPMs. Some example IECs are shown in Table 2 below for a plurality of print-related tasks, where the set of PPMs includes an offset printer and a cutting machine. In Table 2, rows 1-3 and 9-14 represent material costs, and rows 5-8 represent labor costs.

also obtain shop floor data that indicates the bulk price of various printing materials (e.g., ink which may be purchased in volumes of 10 pounds but slowly dispensed with only fractions of a pound being used for various print jobs).

TABLE 2

| No. | Category | Units | Unit Label | Time (hrs) | Cost ($) | Markup | Sell |
|---|---|---|---|---|---|---|---|
| 1 | Material | 1,000 | Sheets | | $13,850.00 | $4,570.50 | $18,420.50 |
| 2 | Spoilage | 175 | Sheets | | $ 2,588.75 | $ 854.28 | $ 3,443.03 |
| 3 | Cutting Machine | 0 | | | $ 0 | $ 0 | $ 0 |
| 4 | Plates | 5 | Plates | | $ 69.25 | $ 22.85 | $ 92.10 |
| 5 | Printing Machine Setup | 275 | Sheets | 2.6 | $ 4,248.75 | $1,402.08 | $ 5,650.83 |
| 6 | Printing Machine Run Time | 4,425 | Impressions | 0.75 | $ 123.75 | $ 40.83 | $ 164.58 |
| 7 | Printing Machine Run Time Extra Process | 1,000 | Impressions | 0.06 | $13,869.90 | $4,577.06 | $18,446.96 |
| 8 | PPM clean up | 5,425 | Lbs. | 0.7 | $ 115.50 | $ 38.11 | $ 153.61 |
| 9 | Ink | 0.1125 | Lbs. | | $ 1.40 | $ 0.46 | $ 1.86 |
| 10 | Ink | 0.1785 | Lbs. | | $ 1.72 | $ 0.57 | $ 2.29 |
| 11 | Ink | 0.1952 | Lbs. | | $ 1.65 | $ 0.54 | $ 2.19 |
| 12 | Ink | 0.2285 | Lbs. | | $ 3.42 | $ 1.31 | $ 4.73 |
| 13 | Coating | 0.2765 | Lbs. | | $ 3.96 | $ 1.30 | $ 5.26 |
| 14 | Varnish | 0.2168 | Lbs. | | $ 3.31 | $ 1.09 | $ 4.40 |
| | Total | | | | $18,442.61 | $6,086.20 | $24,528.81 |

The job described above is an offset print job that prints four colors and has a coating and varnish added. Spoilage (row 2 above) refers to test printing runs that have to be done as a preliminary step before a print job is executed, which causes intentionally wasted printing material, and also to "potential error" sheets that could be spoiled during a print run process.

The ERP system 22 stores a plurality of IECs 42 for a plurality of different types of print jobs. As shown in the example above, the IECs include material costs (e.g., ink, coating, varnish, spoilage, material) and also include labor costs (e.g., printing machine setup, PPM cleanup, etc.). Optionally, the IECs 42 may include machine costs so that the cost of purchasing or leasing a particular PPM can be passed on to customers, and/or general overhead (e.g., utilities).

Despite attempts by organizations 18 to have their estimates reflect their actual costs, they typically differ substantially for a number of reasons. For example, certain employees may be more efficient than others. Also, worker productivity can diminish throughout a job (e.g., it may take a worker a first amount of time to do a task, such as envelope folding and stuffing, but once they have repeated that task 10,000 times it may take them more time to do that per envelope). For tasks like this which may need to be done by hand (e.g., if a company lacks a machine to do the task), people get fatigued during the course of the task. The shop floor data can capture this diminished productivity (e.g., as an average yield per hour with fatigue or worker breaks included) and the ERP system 22 can use that data for determining future labor costs. Also, machine throughput can vary based on a selected printer speed, which may vary depending on the volume of a print job and how many colors are selected.

To more accurately determine actual costs, the ERP system 22 determines itemized actual costs (IACs) 44 that are determined at least partially based on shop floor data from shop timers 50. The shop timers 50 are used during print-related tasks to more accurately capture how long various print-related tasks take. The ERP system 22 may Optionally, the ERP system 22 may also include one or more neural networks 60A-B, which will be described in more detail below.

Figure 2:
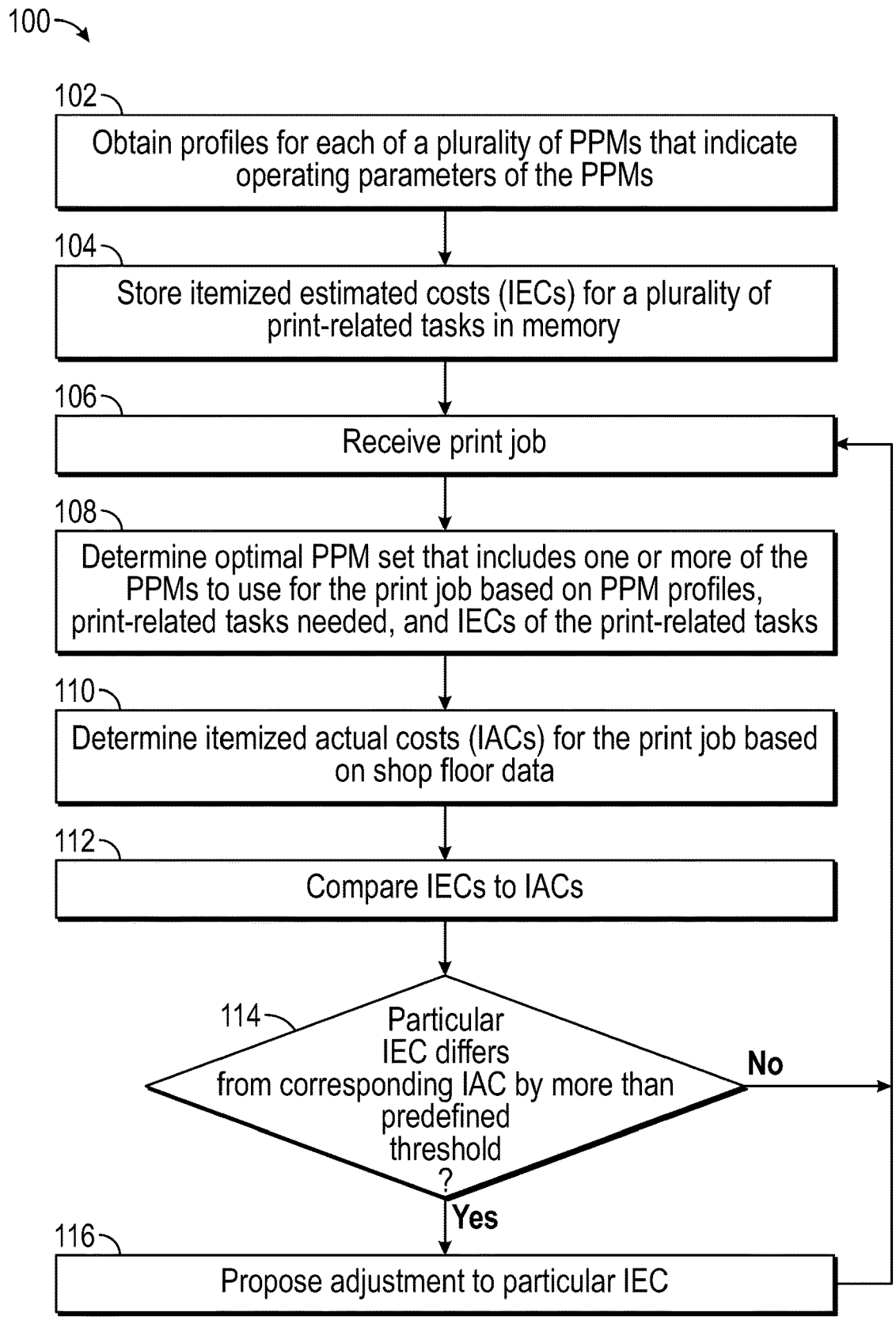
FIG. 2 is a flowchart of an example computer-implemented method for managing print jobs.

FIG. 2 is a flowchart of an example computer-implemented method 100 for managing print jobs. The method 100 is implemented by one or more computing devices, such as the web server 20.

The computing device obtains profiles 40 for each of the PPMs 24 that indicate operating parameters of the PPMs 24 (step 102). In one example, step 102 includes the computing device creating the profiles 40. IECs 42 for a plurality of print-related tasks are obtained and stored in memory of the computing device (step 104). The IECs 42 include material costs and labor costs for various print-related tasks. In one example, the materials costs include at least two of ink costs, printing substrate costs (e.g., paper, cardboard, metal, wood, etc.), printing plate creation costs, and spoilage costs.

A print job 12 is received (step 106) from the customer 14, and an optimal PPM set is determined for the print job 12 (step 108). The optimal PPM set includes one or more of the PPMs 24 to use for the print job 12, and it is determined based on the PPM profiles 40, the print-related tasks needed for the print job 12, and the IECs 42 of the print-related tasks. The print-related tasks could include PPM 24 setup, monitoring operation of the PPM 24 during the print-related tasks (e.g., monitoring a printer or finishing machine), cleanup of the PPM 24 from the print job, and shipping printed material from the print job 12, for example.

In one example, the computing device determines whichever eligible PPM 24 or combination of PPMs 24 that can complete the print job 12 at the lowest cost to be the optimal PPM set. A PPM 24 that is not compatible with a given print job 12 is considered non-eligible for the print job 12. In one example, a PPM 24 that is out of order or that is scheduled for use for more than a particular amount of time (e.g., a week) is also considered non-eligible. Otherwise, a PPM 24 is considered eligible for the print job 12.

The computing device determines IACs 44 for the print job 12 based on shop floor data (step 110). As described above, determining the IACs 44 can include obtaining shop floor timing data for various ones of the print-related tasks corresponding to labor costs from one or more shop floor timers 50 of the organization 18 and/or obtaining shop floor data regarding material costs. At least a portion of the IACs 44 are determined based on the shop floor data.

The IACs 44 are compared to corresponding ones of the IECs 42 (step 112), and a determination is made of whether a particular IAC differs from its corresponding IEC by more than a predefined threshold (step 114). As an example, the actual cost (IAC) for printing machine setup can be compared to the estimated cost (IEC) for setting up the printing machine.

If a particular IAC 44 differs from its corresponding IEC 42 by more than a predefined threshold (a "yes" to step 114), then an adjustment to the corresponding IEC is proposed (step 116) so that the IEC 42 more accurately represents actual costs of the organization 18 for future estimates. In one example, the proposal is transmitted to one of the users 26 that is a manager for approval. In one example, the proposed price adjustment is automatically implemented (e.g., If the manager user 26 has previously authorized such adjustments by the ERP system 22).

Conversely, if the difference between an IAC and its corresponding IEC does not exceed the predefined threshold (a "no" to step 114), then no adjustment is proposed for that IAC.

Steps 106-112 are repeated for a plurality of print jobs 12, which enables the ERP system 22 to refine a plurality of the IECs 42. In one example, an IEC 42 adjustment is only proposed if the IAC 44 differs from its corresponding IEC 42 by more than the predefined threshold more than once (e.g., a predefined number of times and/or an average of the IAC 44 over a plurality of print jobs differs from the IEC 42 by more than the predefined threshold. This could prevent outlier events (e.g., power outages, poorly trained workers, etc.) from adversely affecting the IAC 44.

In one example, the ERP system 22 is also operable to determine an estimated date of completion for a particular one of the print jobs 12 based on other print jobs that are ahead of the particular one of the print jobs 12 in a queue, the PPM profiles 40 for each PPM 24 in the optimal PPM set, and a duration of time needed for each print-related task of the print job 12. This could be used to provide completion date estimates for the customer 14 in the ERP system 22 (e.g., through a web-based interface).

The ERP system 22 may utilize one or more neural networks 60A-B. In one example, a neural network 60A is used to implement artificial intelligence (AI) functionality for predicting when PPM 24 outage events will occur, such as PPM errors and/or PPM maintenance events. Such predictions could be based on determining which types of paper jam a press more frequently, determining which presses need maintenance press before a large run, learning about job type and knowing when to slow down and speedup the press, machine learning about ink saturation in paper types and coverage (e.g., learning how to account for paper porosity to achieve a desired level of ink coverage/saturation), etc. In one example, the neural network 60A is trained with historical data of PPM outage events encountered in previous print jobs, and the neural network 60A is utilized to predict when future PPM outage events will occur. In such an example, the determination of the optimal PPM set (step 108) is further based on the prediction of when the future PPM outage events will occur. For example, if a maintenance task, such as a part replacement, is likely to occur during a large run print job, it may make sense to either perform that maintenance task before initiating the print job or to select a PPM set that excludes the printer that is likely to need maintenance. To train the neural network 60A, the ERP system 22 may obtain operational data from the various PPMs 24, such as data indicating a quantity of sheets processed since a last maintenance task was performed (e.g., toner replacement, blade replacement, technician checkup, etc.).

By providing predictions of job errors and related scheduling issues (e.g., predicting machine down time), the ERP system 22 can determine the most optimal PPM set for the print job 12. Thus, determination of the optimal PPM set can be based on cost (e.g., lowest cost) alone, or in combination with other factors (e.g., predicted maintenance). If there is a particular one of the PPMs 24 that is considerably better than others of the PPMs 24, it is likely that the particular PPM 24 will be used for more print jobs, and that the particular PPM 24 will incur a greater amount of wear and tear than others of the PPMs 24 The likelihood that undesired PPM outage events are likely to occur for the particular PPM may make it more desirable to use other ones of the PPMs that are used less often for a given print job 12. The neural network 60A facilitates such determinations by the ERP system 22.

Figure 3:
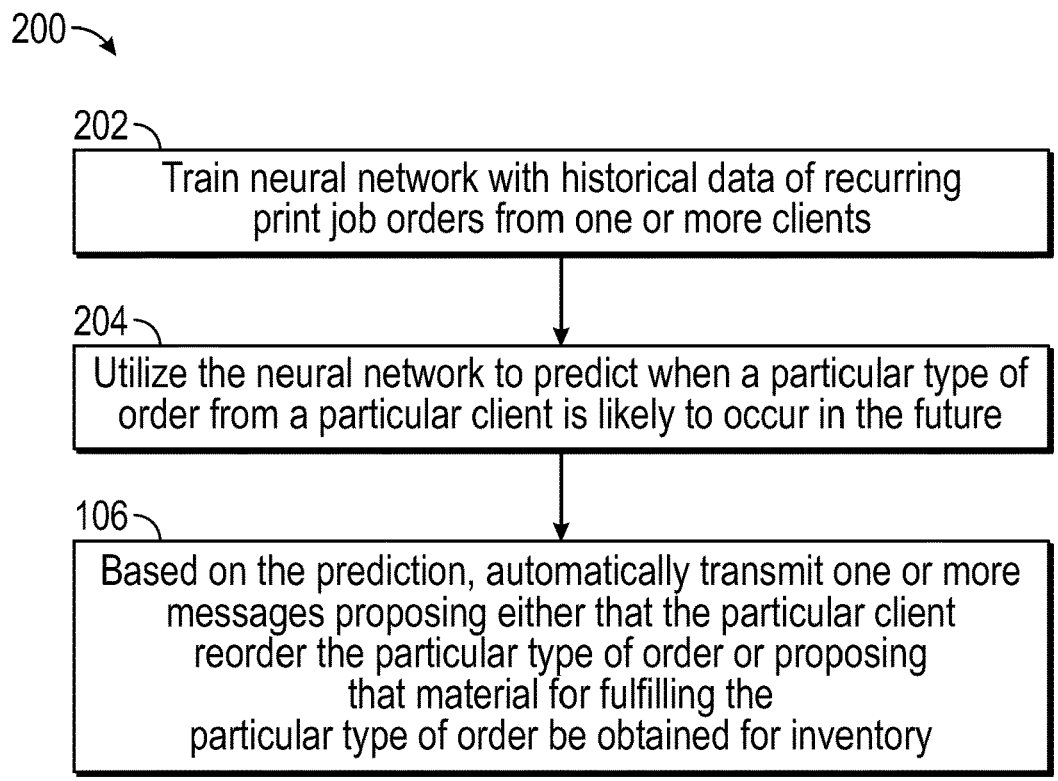
FIG. 3 is a flowchart of an example AI-assisted method for managing print jobs.

FIG. 3 is a flowchart of an example AI-assisted method 200 for managing print jobs, and more particularly for predicting when to reorder inventory supplies and/or to prompt customers to reorder print jobs 12. The neural network 60B is trained with historical data of recurring print job orders from one or more clients (step 202). The neural network 60B is utilized to predict when a particular type of orders from the particular client is likely to occur in the future (step 204) (e.g., based on the historical data, predict that the client usually orders business cards in July and/or usually orders new yard signs in March).

Based on the prediction, the ERP system 22 automatically transmits one or more message proposing either that the particular client reorder one of the particular type of order or proposing that material for fulfilling the particular type of order be obtained by the organization 18 for inventory (step 206). In one example, step 206 includes sending an email to the client proposing that they reorder the particular type of order in advance (e.g., transmit message to the client in February to reorder signs likely to be needed in March and/or in June to suggest reorder of business cards likely to be needed in July). In one example, step 206 includes transmitting a message to one of the users 26 suggesting more business card ink or paper or sign substrate or ink materials be ordered in anticipation of the client order that is likely to occur in the future.

This enables the ERP system 22 to learn a customer's "busy season," market more proactively towards the customer 14, and offer better service with faster turn-around (less jobs in-house, faster turn without delays). Prompting the organization 18 to reorder supplies can help avoid workflow interruption that may otherwise occur if the supplies were not preordered.

Figure 4:
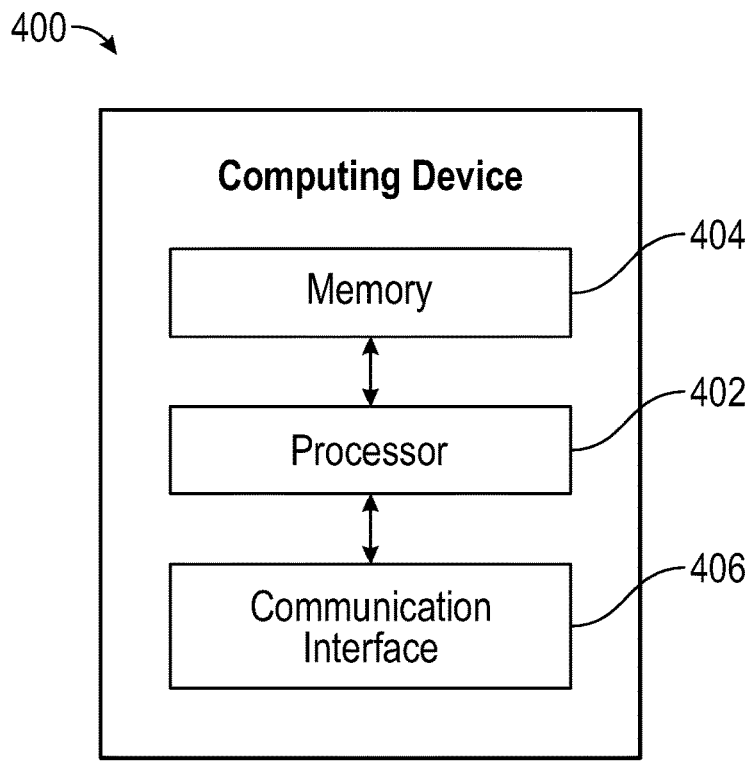
FIG. 4 is a schematic view of an example computing device that can be used in the system of FIG. 1.

FIG. 4 is a schematic view of an example computing device 400 that may be used as the web server 20, computing devices 28, and/or computing device 16. The computing device 400 includes a processor 402 that is operatively connected to memory 404 and a communication interface 406.

The processor 402 includes one or more microprocessors, microcontrollers, application specific integrated circuits (ASICs), or the like, for example. In one example, the processor 402 is configured to carry out the steps of the method 100 and optionally also the method 200.

The memory 404 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 404 may incorporate electronic, magnetic, optical, and/or other types of storage media. The memory 404 can also have a distributed architecture, where various components are situated remotely from one another, but can be accessed by the processor 402. In one example, the memory 404 includes one or more databases that store the PPM profiles 40, IECs 42, IACs 44, and neural networks 60A-B.

The communication interface 406 provides for communication between the computing device 400 and other devices, such as the PPMs 24 and/or computing devices 16, 28. The communication interface 406 may include a wired or wireless network transceiver, for example (e.g., an Ethernet, WiFi, or cellular transceiver).

The ERP system 22 described herein provides for a centralized source that can tie in various features, such as production, customer service, vendors, and customers to interact and give the best possible experience. The ERP system 22 may be configured to provide automatic due are based on customer interaction and not just hard dates (due date is 5 days after proof approval—customer must approve artwork first before getting a due date). The ERP system 22 may be configured to send out email follow-ups for such approval. The ERP system 22 may also be configured to optimize "imposition," which refers to setting up artwork in an optimal position on a sheet for the least amount of folds.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A computer-implemented method, comprising:
    obtaining, for each of a plurality of print processing machines (PPMs) of an organization, a profile that indicates a plurality of operating parameters of the PPM;
    storing itemized estimated costs for a plurality of print-related tasks in a database, the itemized estimated costs including material costs and labor costs for the print-related tasks;
    receiving a plurality of print jobs;
    for each print job, determining an optimal PPM set that includes one or a combination of the PPMs that are eligible to use for the print job based on the PPM profiles, the print-related tasks needed for the print job, and the itemized estimated costs of the print-related tasks;
    determining itemized actual costs for the plurality of print jobs based on shop floor data from the organization;
    comparing the itemized actual costs to corresponding ones of the itemized estimated costs; and
    transmitting a notification that proposes a change to a particular itemized estimated cost based on a difference between the itemized actual cost and itemized estimated cost exceeding a predefined threshold.

2. The computer-implemented method of claim 1, wherein said determining itemized actual costs for the plurality of print jobs based on shop floor data comprises:
    receiving timing data for various ones of the print-related tasks corresponding to labor costs from one or more shop floor timers of the organization; and
    determining at least a portion of the itemized actual costs based on the timing data.

3. The computer-implemented method of claim 1, wherein said determining the optimal PPM set comprises:
    determining whichever eligible PPM or combination of eligible PPMs that can complete the print job at the lowest cost to be the optimal PPM set.

4. The computer-implemented method of claim 1, wherein the PPMs include a plurality of different types of printers and at least one finishing machine.

5. The computer-implemented method of claim 4, wherein the at least one finishing machine includes one or more of a folding machine, a binding machine, a counting machine, a sorting machine, a gluing machine, a cutting machine, and a router machine.

6. The computer-implemented method of claim 1, comprising:
    determining an estimated date of completion for a particular one of the print jobs based on other print jobs that are ahead of said particular one of the print jobs in a queue, the PPM profiles for each PPM in the optimal PPM set, and a duration of time needed for each print-related task of the print job.

7. The computer-implemented method of claim 1, comprising:
    training a neural network with historical data of PPM outage events encountered in previous print jobs, wherein the PPM outage events include at least one of PPM errors and PPM maintenance events;
    utilizing the neural network to predict when future PPM outage events will occur; and
    further basing said determining an optimal PPM set on the prediction of when future PPM outage events will occur.

8. The computer-implemented method of claim 1, comprising:
    training a neural network with historical data of recurring orders from a particular client;
    utilizing the neural network to predict when a particular type of order from the particular client is likely to occur in the future; and
    based on the prediction, automatically transmitting one or more messages proposing either that the particular client reorder the particular type of order or proposing that material for fulfilling the particular type of order be obtained by the organization.

9. The computer-implemented method of claim 1, wherein the print-related tasks for a given print job include at least two of setup for the print job, monitoring operation of a PPM in the optimal PPM set during the print job, cleanup of a PPM in the optimal PPM set from the print job, and shipping printed material from the print job.

10. The computer-implemented method of claim 1, wherein the materials costs include at least two of ink costs, printing substrate costs, printing plate creation costs, and spoilage costs.

11. The computer-implemented method of claim 1, wherein at least a portion of the itemized cost estimates also include machine costs that allocate a portion of a purchase price of the machine to a particular print job.

12. A computing device comprising:
    memory; and
    a processor operatively connected to the memory and configured to:

obtain, for each of a plurality of print processing machines (PPMs) of an organization, a profile that indicates a plurality of operating parameters of the PPM;

store itemized estimated costs for a plurality of print-related tasks in a database, the itemized estimated costs including material costs and labor costs for the print-related tasks;

receive a plurality of print jobs;

for each print job, determine an optimal PPM set that includes one or a combination of the PPMs that are eligible to use for the print job based on the PPM profiles, the print-related tasks needed for the print job, and the itemized estimated costs of the print-related tasks;

determine itemized actual costs for the plurality of print jobs based on shop floor data from the organization;

compare the itemized actual costs to corresponding ones of the itemized estimated costs; and transmit a notification that proposes a change to a particular itemized estimated cost based on a difference between the itemized actual cost and itemized estimated cost exceeding a predefined threshold.

13. The computing device of claim 12, where to determine itemized actual costs for the plurality of print jobs based on shop floor data, the processor is configured to:

receive timing data for various ones of the print-related tasks corresponding to labor costs from one or more shop floor timers of the organization; and determine at least a portion of the itemized actual costs based on the timing data.

14. The computing device of claim 12, wherein to determine the optimal PPM set, the processor is configured to:

determine whichever eligible PPM or combination of eligible PPMs that can complete the print job at the lowest cost to be the optimal PPM set.

15. The computing device of claim 12, wherein the PPMs include a plurality of different types of printers and at least one finishing machine.

16. The computing device of claim 15, wherein the at least one finishing machine includes one or more of a folding machine, a binding machine, a counting machine, a sorting machine, a gluing machine, a cutting machine, and a router machine.

17. The computing device of claim 12, wherein the processor is configured to:

determine an estimated date of completion for a particular one of the print jobs based on other print jobs that are ahead of said particular one of the print jobs in a queue, the PPM profiles for each PPM in the optimal PPM set, and a duration of time needed for each print-related task of the print job.

18. The computing device of claim 12, wherein the processor is configured to:

train a neural network with historical data of PPM outage events encountered in previous print jobs, wherein the PPM outage events include at least one of PPM errors and PPM maintenance events;

utilize the neural network to predict when future PPM outage events will occur; and further base said determination of an optimal PPM set on the prediction of when future PPM outage events will occur.

19. The computing device of claim 12, wherein the processor is configured to:

train a neural network with historical data of recurring orders from a particular client;

utilize the neural network to predict when a particular type of order from the particular client is likely to occur in the future; and based on the prediction, automatically transmit one or more messages proposing either that the particular client reorder the particular type of order or proposing that material for fulfilling the particular type of order be obtained by the organization.

20. The computing device of claim 12, wherein:

the print-related tasks for a given print job include at least two of setup for the print job, monitoring operation of a PPM in the optimal PPM set during the print job, cleanup of a PPM in the optimal PPM set from the print job, and shipping printed material from the print job; and the materials costs include at least two of ink costs, printing substrate costs, printing plate creation costs, and spoilage costs.

* * * * *